United States Patent
Vaccari

(10) Patent No.: US 11,298,888 B2
(45) Date of Patent: Apr. 12, 2022

(54) PROCESS FOR THE REALIZATION OF COUNTER-MOULD ELEMENTS FOR THE CONTAINMENT OF WELDING BEAD OF PLASTIC PROFILED ELEMENTS

(71) Applicant: Graf Synergy S.r.l., Nonantola (IT)

(72) Inventor: Andrea Vaccari, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 575 days.

(21) Appl. No.: 16/327,825

(22) PCT Filed: Sep. 1, 2017

(86) PCT No.: PCT/IB2017/055269
§ 371 (c)(1),
(2) Date: Feb. 24, 2019

(87) PCT Pub. No.: WO2018/042380
PCT Pub. Date: Mar. 8, 2018

(65) Prior Publication Data
US 2019/0193342 A1  Jun. 27, 2019

(30) Foreign Application Priority Data

Sep. 2, 2016  (IT) ......................... 102016000089437

(51) Int. Cl.
*B29C 65/00* (2006.01)
*B33Y 80/00* (2015.01)
(Continued)

(52) U.S. Cl.
CPC ...... *B29C 66/52431* (2013.01); *B29C 64/106* (2017.08); *B29C 64/386* (2017.08);
(Continued)

(58) Field of Classification Search
CPC . B29C 66/8122; B29C 66/71; B29K 2901/00; B29K 2027/06
See application file for complete search history.

(56) References Cited

U.S. PATENT DOCUMENTS

2005/0035498 A1  2/2005  Stevens
2006/0097422 A1  5/2006  Diamond
(Continued)

FOREIGN PATENT DOCUMENTS

| DE | 1910308 | 9/1970 |
| DE | 1910308 A1 * | 9/1970 ......... B29C 66/8167 |
| WO | WO 2014/118728 | 8/2014 |

OTHER PUBLICATIONS

International Search Report and the Written Opinion dated Dec. 12, 2017 From the International Searching Authority Re. Application No. PCT/IB2017/055269. (12 Pages).

*Primary Examiner* — Francisco W Tschen
*Assistant Examiner* — Abhishek A Patwardhan

(57) ABSTRACT

Process for the realization of counter-mould elements for the containment of welding bead of plastic profiled elements, in which counter-mould elements (1) have a main body (2) adapted to receive in abutment a pair of profiled elements of plastic material welded together to obtain a frame for windows/doors, each profiled element comprising a welding surface weldable to the welding surface of another profiled element in a welding configuration in which the lateral faces of profiled elements are substantially adjacent to one another and define a locator surface, wherein the process comprises:
  a phase of acquisition of the profile of a portion of the lateral faces;
  a phase of definition of the profile of a contact surface (3) of the main body (2) adapted to receive in abutment the locator surface, the profile of the contact surface (3) being substantially complementary to the profile of the locator surface;

(Continued)

a phase of three-dimensional molding obtained by means of a three-dimensional molding device (4) to obtain the main body (2) starting from the profile of the contact surface (3) obtained in the phase of definition.

9 Claims, 2 Drawing Sheets

(51) Int. Cl.
*B33Y 50/00* (2015.01)
*B29C 64/386* (2017.01)
*B29C 64/106* (2017.01)
*B33Y 10/00* (2015.01)
*B29L 31/00* (2006.01)
*B29C 65/02* (2006.01)

(52) U.S. Cl.
CPC ........ *B29C 66/324* (2013.01); *B29C 66/8122* (2013.01); *B33Y 10/00* (2014.12); *B33Y 50/00* (2014.12); *B33Y 80/00* (2014.12); *B29C 65/02* (2013.01); *B29C 66/71* (2013.01); *B29C 66/8163* (2013.01); *B29C 66/81431* (2013.01); *B29L 2031/005* (2013.01); *B29L 2031/757* (2013.01)

(56) References Cited

U.S. PATENT DOCUMENTS

| | | | |
|---|---|---|---|
| 2010/0221504 A1* | 9/2010 | Bauer | B29C 64/112 428/195.1 |
| 2010/0251643 A1* | 10/2010 | Rosende | E06B 1/62 52/204.2 |
| 2017/0037674 A1* | 2/2017 | Hooper | B33Y 10/00 |

* cited by examiner

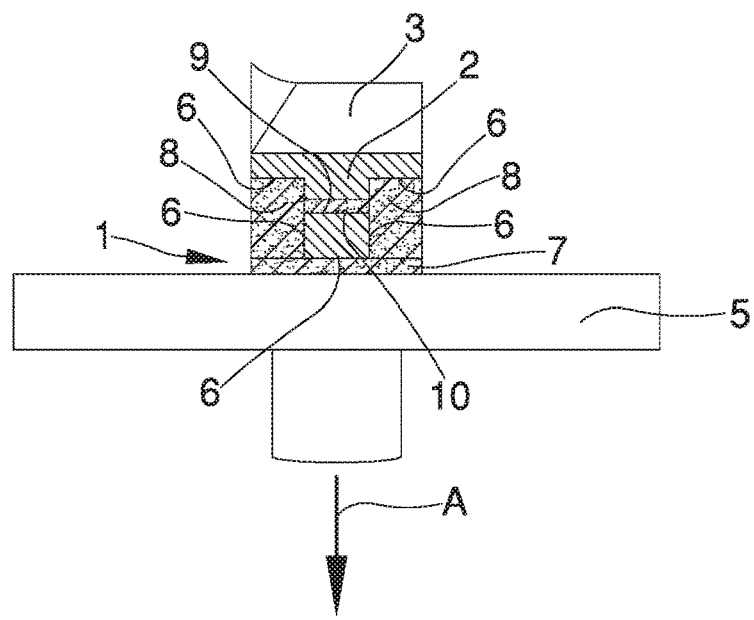
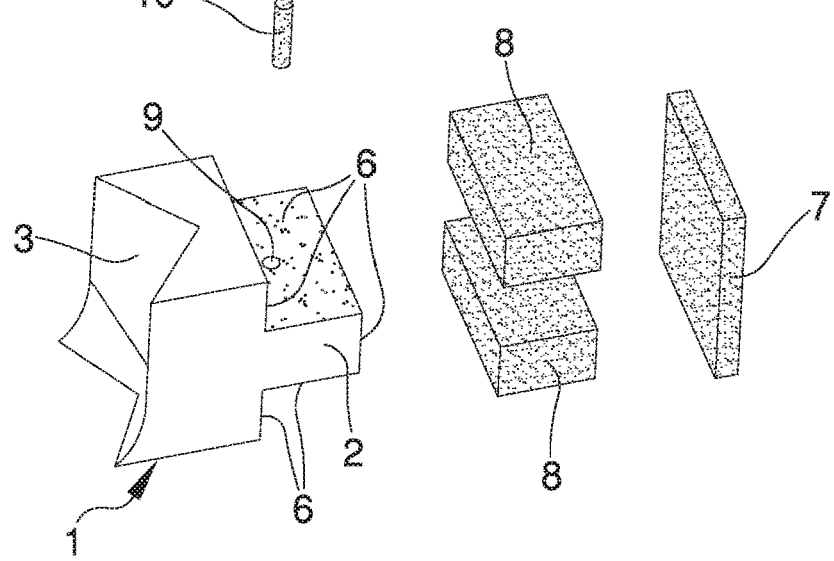
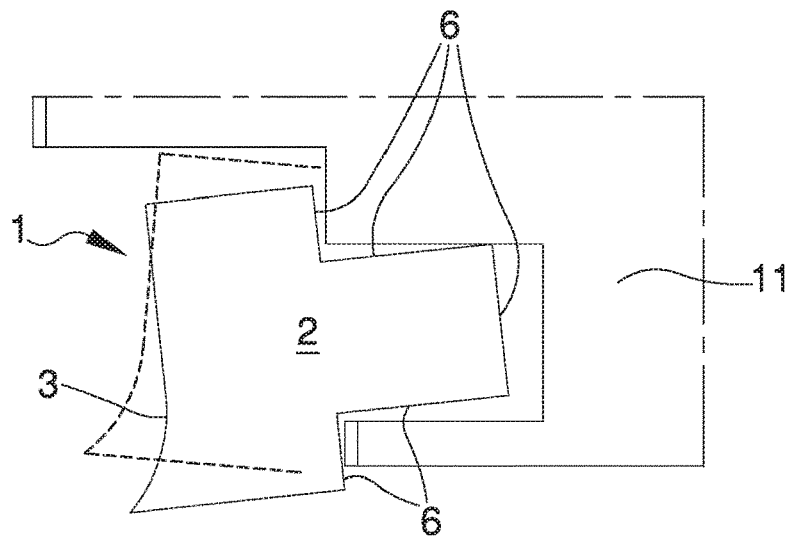

ived with respective retention members of the profiled elements, movable in reciprocal approach to bring the heated extremities to be welded into contact.

PROCESS FOR THE REALIZATION OF COUNTER-MOULD ELEMENTS FOR THE CONTAINMENT OF WELDING BEAD OF PLASTIC PROFILED ELEMENTS

RELATED APPLICATIONS

This application is a National Phase of PCT Patent Application No. PCT/IB2017/055269 having International filing date of Sep. 1, 2017, which claims the benefit of priority of Italian Patent Application No. 102016000089437 filed on Sep. 2, 2016. The contents of the above applications are all incorporated by reference as if fully set forth herein in their entirety.

FIELD AND BACKGROUND OF THE INVENTION

The present invention relates to a process for the realization of counter-mould elements for the containment of welding beads of plastic profiled elements.

In prior art, profiled elements made of plastic, such as PVC or the like, most often used as door and window frameworks, are welded together by melting of respective head surfaces in order to realize a framing structure applicable to doors, windows, or wall frames of same.

In particular, the melting occurs by heating the portions to be connected by means of suitable electric resistor plates and then pressing the heated portions the one against the other to facilitate their melting.

Generally, the heated portions are the head surfaces of the profiled elements, suitably cut to 45° to define, for example, a right-angled portion of a respective window or door framework.

This method is implemented by welding machines provided with respective retention members of the profiled elements, movable in reciprocal approach to bring the heated extremities to be welded into contact.

Other machines are also equipped with finishing systems, adapted to remove the bead or welding bead which forms during the melting of the two profiled elements.

In fact, at the joining line of the two profiled elements (45° cut surfaces), the excess molten material comes out and forms a bead protruding from the exposed surface of the profiled elements.

For this reason, in order to give the finished window or door framework an appreciable aesthetic appearance, once welded the profiled elements undergo a bead removal process.

The known welding devices, briefly described above, nevertheless have major drawbacks mainly related to the formation of said welding bead.

In fact, it must be considered that the welding area of the plastic profiled elements is not entirely homogeneous and, therefore, to make the profiles regular, lots of material is melted with the consequent formation of abundant bead, and therefore abundant waste material which has to be removed.

In addition, the finishing operations adapted to remove the bead and clean the welding area significantly affect the overall window or door framework machining times.

It must be noticed, in fact, that for each window or door framework welding, the profiled elements must be subsequently machined.

Furthermore, in the case of spoked profiled elements, the removal of said bead is highly complicated.

This entails the need to bear additional machining times and costs, in view also of the presence of additional bulky equipment and tools.

The patent document WO 2013/132406 A1 discloses a method and a device which allow overcoming the aforementioned drawbacks.

The system illustrated in WO 2013/132406 A1, in fact, is equipped with two mobile retention elements on which the profiled elements are mounted and allows welding them without forming any welding bead, thanks to a previous milling operation of the areas to be welded, adapted to obtain, on the profiled elements, a containment compartment for the welding bead, and to the fitting of containment pressers, which are brought up to the heated profiled elements during welding and prevent the molten material from escaping from the containment compartment.

An improved typology of pressing elements is shown in patent document WO 2014/122572 A1.

The methods and devices shown in the WO 2013/132406 A1 and WO 2014/122572 A1 documents are also likely to be further improved to obtain door and window frameworks of an even higher quality.

In this regard, the fact is underlined that the containment pressers provided in the documents WO 2013/132406 A1 and WO 2014/122572 A1 allow containing the welding bead only at the main faces of the profiled elements but not at the lateral faces, i.e., those meant to define the perimeter sides of the door/window which couple up with the relevant wall frame (the outer perimeter side) and with the inner panel made of glass or other material (the inner perimeter side).

In this sense, the presence of a welding bead on the outer perimeter side may be unattractive and/or dangerous (sometimes the welding bead has a sharp profile) when the door/window is open.

To remedy, at least in part, some of these drawbacks, the devices built in accordance with the teachings of documents WO 2013/132406 A1 and WO 2014/122572 A1 have been equipped with special lateral containment systems made up of two movable sides, made of aluminum and mounted on the retention members, one side for each retention member.

When the heated profiled elements are brought up close to one another to melt the areas to be welded, the sides settle on the profiled elements (one side for each profiled element) and prevent the escape of the welding bead at the lateral faces as well.

The results obtained by using such sides however are rather unsatisfactory.

European patent application no. 16178595.1 describes a machine for welding plastic profiled elements which allows overcoming the aforementioned drawbacks.

Such machine is provided with a pair of retention members, associated with a base frame, adapted to retain respective plastic profiled elements provided with lateral faces and with respective areas to be welded defined at the lateral faces themselves. These areas to be welded can be welded together by means of a heat-sealing element mounted on the base frame.

Furthermore, the machine comprises lateral containment means mounted on the base frame and adapted to abut on the areas to be welded for the containment of a welding bead which forms following the welding of the areas to be welded.

In the present case, the lateral containment means comprise one or more V-shaped elements having two sides arranged substantially in a V pattern and adapted to abut on at least a portion of the lateral faces of the profiled elements defining the perimeter sides of the frame which, in an assembly configuration, will be turned towards the wall frame.

When the heated profiled elements are brought nearer to one another to melt the areas to be welded, the V-shaped element is adapted to the containment of the escaping welding bead.

The lateral containment means of known type described above are, however, susceptible to upgrading aimed at a more practical and easier embodiment of the V-shaped elements taking into account the fact that the profiles of the outer faces of the profiled elements vary enormously according to the manufacturer.

The fact must also be taken into account that the manufacturing tolerances for the plastic profiled elements are quite large (substantially around five tenths of a millimeter) and this implies the need to use V-shaped elements made purposely according to the profiled elements made by each manufacturer.

SUMMARY OF THE INVENTION

The main aim of the present invention is to provide a process for the realization of counter-mould elements for the containment of welding beads of plastic profiled elements, wherein such counter-mould elements are simple, practical and easily adaptable according to the profiles of the profiled elements used to manufacture the frames for window and door frameworks.

One object of the present invention is to provide a process for the realization of counter-mould elements for the containment of welding beads of plastic profiled elements which requires reduced manufacturing times and costs.

Yet another object of the present invention is to provide a process for the realization of counter-mould elements for the containment of welding beads of plastic profiled elements which, following the welding of the areas to be welded, permits obtaining frames for window and door frameworks having lateral faces with profiles that are as regular and conforming as possible and without welding beads so as to facilitate the window or door framework installation, opening and closing operations.

Another object of the present invention is to provide a process for the realization of counter-mould elements for the containment of welding beads of plastic profiled elements which allows to overcome the aforementioned drawbacks of the prior art within the ambit of a simple, rational, easy, efficient to use and cost-effective solution.

The aforementioned objects are achieved by the present process for the realization of counter-mould elements for the containment of welding beads of plastic profiled elements having the characteristics of claim 1.

BRIEF DESCRIPTION OF THE SEVERAL VIEWS OF THE DRAWINGS

Other characteristics and advantages of the present invention will become more evident from the description of a preferred, but not exclusive, embodiment of a process for the realization of counter-mould elements for the containment of welding beads of plastic profiled elements, illustrated by way of an indicative, but non-limiting example, in the attached drawings in which:

FIGS. 2, 3 and 4 schematically illustrate the process for the realization of counter-mould elements according to the invention;

FIG. 5 is an exploded view of the counter-mould element realized by means of the process according to the invention;

FIG. 6 is a side view of the counter-mould element realized by means of the process according to the invention in an assembly configuration.

DESCRIPTION OF SPECIFIC EMBODIMENTS OF THE INVENTION

Figure 1:
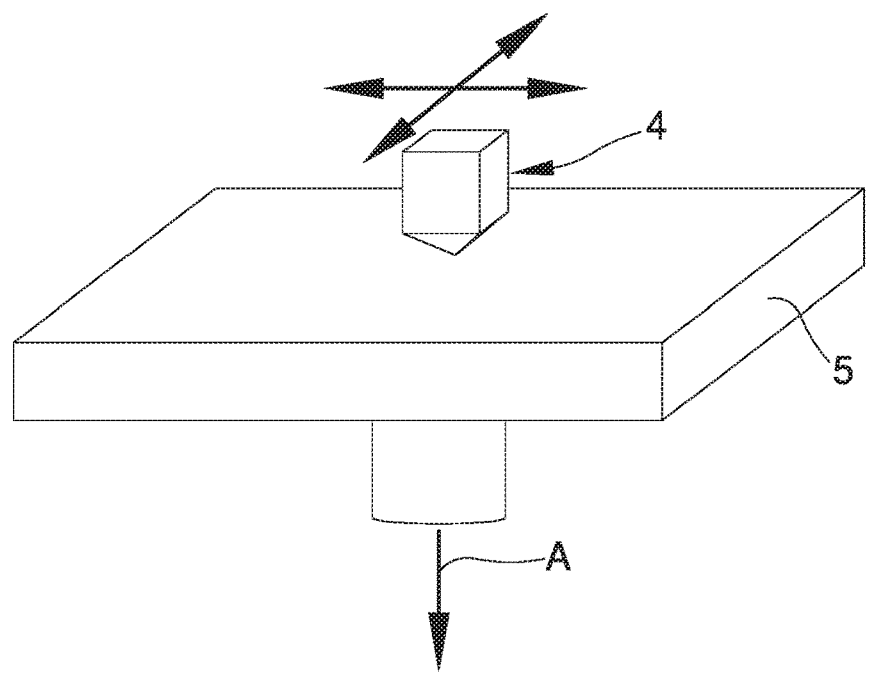
FIG. 1 is an axonometric view of a detail of the three-dimensional molding device used for the realization of counter-mould elements by means of the process according to the invention.
Figure 2:
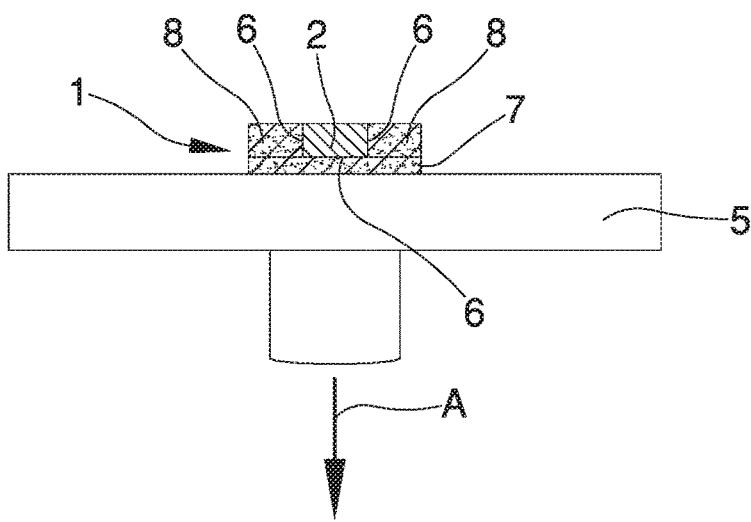
Figure 3:
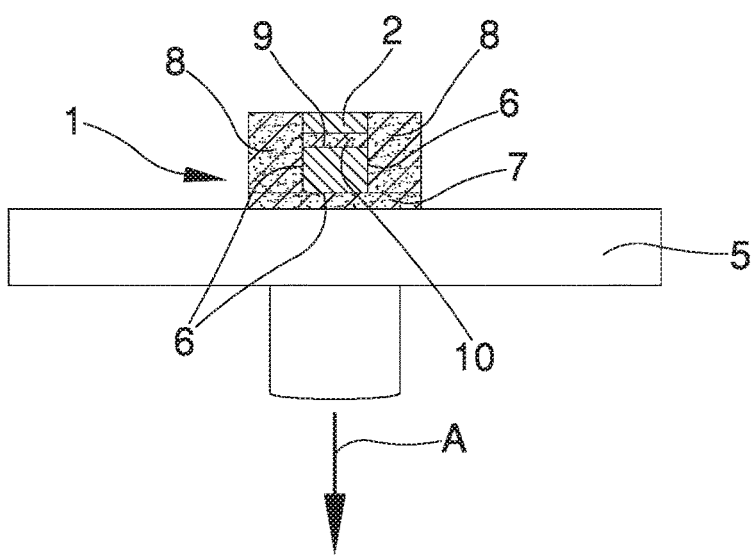

The present invention relates to a process for the realization of counter-mould elements for the containment of welding beads of plastic profiled elements which forms during the melting of the two profiled elements.

In the preferred embodiment shown in the figures, the counter-mould elements 1 have at least one main body 2 adapted to receive in abutment at least one pair of profiled elements of plastic material welded together to obtain a frame for windows/doors.

Each profiled element comprises one welding surface weldable to the welding surface of another profiled element in a welding configuration in which the lateral faces of the profiled elements are substantially adjacent to one another and define a locator surface.

In the present case, the welding surfaces can be welded together by interposing, for example, heated-plate welding means which can be placed in between the welding surfaces of the profiled elements.

In particular, the process comprises:
one phase of acquisition of the profile of at least one portion of the lateral faces;
one phase of definition of the profile of a contact surface 3 of the main body 2 adapted to receive in abutment the locator surface, the profile of the contact surface 3 being substantially complementary to the profile of the locator surface;
one phase of three-dimensional molding obtained by means of one three-dimensional molding device 4 to obtain the main body 2 starting from the profile of the contact surface 3 obtained in the phase of definition.

The phase of acquisition comprises a phase of detecting the perimeter of a cross section of the profiled elements.

Within the scope of the present treatise, by the expression cross section is meant the particular section of the profiled element defined at the welding surface of the profiled element, such section therefore has an orientation substantially rotated by 45° with respect to the longitudinal axis of the profiled element.

It cannot however be ruled out that the detection phase be performed at a cross section of the profiled element other than the welding surface of the profiled section itself.

Preferably, the detection phase consists in acquiring the perimeter of the section of the profiled element by means of detection means.

The detection means, e.g., are of the type of an automatic three-dimensional measuring appliance provided with feeler means adapted to detect digital data relating to the coordinates in the three-dimensional space of the outer surface of the profiled element.

Alternatively, the detection means consist of an electronic scanner.

Usefully, such detection means are provided with means for processing such digital data having in turn suitable software programs, e.g. of the CAD/CAM type, by means of which, starting from the digital data, it is possible to define the profile of the abutment surface.

Alternatively, the profile acquisition phase can occur manually, by entering the corresponding data inside dedicated software.

The phase of definition comprises a phase of adjustment of the movement of the three-dimensional molding device 4 to obtain the main body 2 having the relevant contact surface 3.

More in particular, in such phase of definition, the adjustment occurs of the movement of the three-dimensional molding device 4 according to the perimeter of the section of the profiled element which has been detected during the phase of detection in such a way as to obtain the desired contact surface 3.

The three-dimensional molding device 4 comprises deposition means of at least one liquid photopolymer material and solidification means of the liquid photopolymer material itself.

In particular, the deposition means comprise a nozzle adapted to dispense predefined doses of the liquid photopolymer material.

In the particular embodiment shown in the figures, the solidification means comprise at least one polymerization unit.

More in detail, the polymerization unit is the type of a light source adapted to emit ultraviolet or visible radiation of the electromagnetic spectrum affecting the liquid photopolymer material to obtain the relevant hardening.

Within the scope of the present treatise, the expression liquid photopolymer material means a polymer material the characteristics of which change in case of exposure to light radiation, located in the ultraviolet or visible region of the electromagnetic spectrum.

In other words, the exposure of the photopolymer material to light radiation causes the liquid photopolymer material to stiffen.

The phase of three-dimensional molding comprises:
one phase of deposition of at least one of a first liquid photopolymer material, for the realization of at least one primary layer of the main body 2, and a second liquid photopolymer material, for the realization of at least one secondary layer adhering to at least one portion of the main body 2, to the exclusion of the contact surface 3, and removable from it, such phase of deposition being formed on a substantially horizontal deposition plane 5 by means of the deposition means;
one phase of solidification of at least one of the first photopolymer material and the second photopolymer material by means of the polymerization unit to obtain at least one of the layers, such phase of solidification being subsequent to the phase of deposition; and
one phase of substantially vertical growth of the layers starting from the deposition plane 5, preferably during such growth phase the contact surface 3 being directed upwards with respect to the deposition plane 5.

In the particular embodiment shown in the illustrations, the first liquid photopolymer material is a material of the resinous type.

The second liquid photopolymer material, on the other hand, is a material of the substantially rubbery type.

The main body 2 is defined by the plurality of primary layers made by the first liquid photopolymer material and which have grown vertically one on top of the other.

Advantageously, the contact surface 3 is substantially free of roughness.

Furthermore, the contact surface 3 shows high polish to the eye.

The contact surface 3 and the main body 2 made with the first liquid photopolymer material have high wear and mechanical flex resistance.

In particular, the contact surface 3 is particularly resistant to the temperature of the welding bead resulting from the welding of the surfaces to be welded of the profiled elements.

In other words, the contact surface 3 is resistant and impregnable in the time period in which the molten plastic material resulting from the welding of the surfaces to be welded of the profiled elements is in contact with the contact surface itself.

Preferably, the three-dimensional molding phase is carried out using the Polyjet technique.

Within the scope of the present treatise, by the expression Polyjet technique is meant the process whereby the deposition occurs of layers of liquid photopolymer material, the hardening of which takes place by means of the emission of an ultraviolet radiation which is incident onto them.

In the case in question, the three-dimensional molding device 4 operates by realizing three-dimensional objects starting from the digital data provided through the detection means during the detection phase.

The growth phase consists in the execution of a plurality of deposition and solidification phases which are sequential the one to the other to obtain a plurality of primary and secondary layers grown starting from the deposition plane 5.

Usefully, between one growth phase and another, the deposition plane 5 is moved along a direction of movement a substantially vertical by a predefined pitch corresponding to the thickness of each of the layers to be grown.

In the particular embodiment shown in the illustrations, the three-dimensional molding device 4 is mobile along a plurality of directions on a two-dimensional Cartesian plane, substantially parallel to the deposition plane 5, for the deposition and realization of the primary and secondary layers according to the desired final conformation of the main body 2.

The deposition plane 5 is mobile downwards along the direction of movement A by a pitch coinciding with the thickness of the primary and secondary layers to be deposited.

It cannot however be ruled out that the three-dimensional molding device 4 be mobile along a plurality of directions in a three-dimensional Cartesian space and that the deposition plane 5 remains in stationary position.

During the molding phase, the phases of deposition and solidification of the first liquid photopolymer material and of the second liquid photopolymer material are performed in such a way as to obtain a plurality of primary layers of the main body 2 and a plurality of secondary layers respectively, adhering to the portions 6 of the lateral surface of the main body 2 excluding the contact surface 3.

In particular, on the deposition plane 5 the phase of deposition initially occurs of the second photopolymer material to obtain a base layer 7 on top of which the growth occurs of the main body 2 and of the secondary layers adhering to the main body 2. More in detail, during the vertical growth phase of the counter-mould element 1, a plurality of primary layers are deposited and solidified the one on top of the other so as to define the main body 2 with the relevant contact surface 3.

At the same time as the phase of deposition and solidification of the primary layers, the deposition and solidification occur of a plurality of secondary layers to obtain at least a secondary body 8 grown on top of the base layer 7 and adhering to at least one of the portions 6 of the lateral surface of the main body 2.

Usefully, during the growth phase, the deposition and solidification occur of a plurality of secondary layers on top of the previously grown primary layers of the main body 2 so as to define at least a through cavity 9 of the main body 2.

The secondary layers grown to obtain the through cavity 9 define at least a filling body 10 which has a cross section substantially coinciding with the cross section of the through cavity itself.

In the embodiment shown in the illustrations, the counter-mould element 1 has a pair of secondary bodies 8 adhering to the portions 6 of the lateral surface of the main body 2 and removable from it.

In the case in question, the secondary bodies 8 are adherent on opposite sides of the main body 2 so as to define the desired shape of the counter-mould element 1.

The process comprises one phase of removal of the secondary layers from the main body 2, or the removal of the secondary bodies 8 from the main body 2.

In more detail, during the phase of removal the secondary bodies 8 are removed definitely from the main body 2.

Following the removal phase of the secondary bodies 8, the portions 6 of the lateral surface of the main body 2 are substantially rough and opaque.

In the light of the fact that the first liquid photopolymer material has different characteristics and properties with respect to the second liquid photopolymer material, the growth phase of the secondary layers adhering to the primary layers results in the portions 6 of the lateral surface of the main body 2 to which the secondary bodies 8 adhere being rough.

The lateral surface of the main body 2, excepting the portions 6, is substantially free of roughness and appears polished to the eye.

Advantageously, the contact surface 3 and the lateral surface of the main body 2 have levels of wear resistance greater than the portions 6 of the lateral surface, as well as being aesthetically more appealing to the eye.

Furthermore, the roughness of the portions 6 of the lateral surface results in the main body 2 being mountable by interlocking onto a support body 11, shown by way of example in FIG. 6, by means of suitable supporting means.

The support body 11 comprises at least an interlocking seat having a profile substantially complementary to the profile of the main body 2 defined at the portions 6 of the lateral surface.

The portions 6 of the lateral surface of the main body 2 have a degree of friction with the walls of the interlocking seat such as to keep the main body 2 and the support body 11 in a blocking configuration wherein the main body 2 is associated in fixed position to the support body 11 by means of the supporting means.

More in detail, during the removal phase, the secondary layers grown and contained inside the through cavity 9 are removable, using suitable removal means of the manual or automatic type, so the through cavity itself is clear and free for the insertion of elements for fixing the main body 2 to the support body 11.

The growth phase is performed in such a way that the contact surface 3 is provided with a pair of margins having, preferably, a substantially upward pointed conformation and wherein each margin is converging at least a groove defined on the lateral surface of the main body 2.

Advantageously, such groove is adapted to contain the presser means adapted to abut on the areas to be welded when the profiled elements are brought into contact and pressed the one against the other.

In particular, the presser means are adapted to stem the molten material of the profiled elements which comes out following the welding of the areas to be welded. By sectioning the main body 2 on a horizontal plane, the contact surface 3 is provided with a pair of sides positioned so as to form an angle of about 90° with each other, so as to abut perfectly on the lateral faces facing the contact surface 3 these too arranged at 90° with each other.

The present invention also relates to a machine for welding plastic profiled elements, not shown globally in the illustrations, comprising:

a base frame;

retention members adapted to retain a pair of plastic profiled elements in fixed position on the base frame;

heated-plate heat-welding means mounted on the base frame and provided with two faces, opposite one another, on which opposite areas to be welded of each profiled element can be arranged in contact;

sliding means of the retention members which are interposed between the base frame and the retention members and are adapted to displace the profiled elements between a mutual moving away position and a mutual approach position wherein the heated areas to be welded are joined together;

lateral containment means mounted on said base frame and adapted to abut on the abutment surface for the containment of a welding bead obtained following the welding of the areas to be welded.

The lateral containment means are mounted on the base frame and adapted to abut on the areas to be welded for the containment of the welding bead.

In more detail, the lateral containment means comprise at least one counter-mould element 1 realized by means of the previously described process.

The lateral containment means can comprise a plurality of counter-mould elements 1 which are arranged so as to abut on respective portions of the lateral faces.

Alternative embodiments of the present invention cannot however be ruled out wherein the counter-mould element 1 is just one and such as to substantially cover the entire extension of the first lateral edges 4a.

It is easy to appreciate that the machine can be equipped with diverse kits of lateral containment means which differ from one another in terms of the number and the shape of the counter-mould elements 1, so as to be able to operate on all the profiled elements available on the market.

Depending on the type of profiled element to be welded in fact, all that is required is to mount the lateral containment means on the machine having the counter-mould element or the counter-mould elements 1 shaped in conformity with the lateral faces of the profiled elements.

The lateral containment means comprise at least a support body 11 which supports the counter-mould elements 1 and which is mounted on the base frame in a mobile manner at least along a direction of sliding, substantially straight and horizontal, for the abutment of the counter-mould elements 1 on the lateral faces of the profiled elements.

Alternative embodiments cannot however be ruled out wherein the direction of sliding along which the lateral containment means move to abut on the profiled elements is curvilinear or otherwise directed.

Usefully, the counter-mould elements 1 are mounted on the support body 11 by interposition of the fastening means of the type of at least a pin, preferably more than one, which associates with the support body 11 and is fitted with play inside the through cavity 9.

The presence of the fastening means permits, during welding, adapting the position of the counter-mould elements 1 to the deformation phenomena of the molten material, by oscillating or rotating vertically or horizontally, ensuring that the contact surface 3 always remain in contact with the abutment surface.

It has in practice been ascertained that the described invention achieves the proposed objects and in particular the fact is underlined that the process thus obtained permits obtaining counter-mould elements that are simple and practical to make for the containment of welding beads of plastic profiled elements.

What is more, such realization process is particularly versatile and adaptable to obtain the counter-mould elements having conformations complementary with the profiles of the profiled elements used to make frames for window and door frameworks.

It follows therefore that such process allows cutting the manufacturing times and costs of the counter-mould elements.

This way, manufacturing operations are particularly easy in the case of the profiles of the profiled elements varying according to the particular window and door frameworks to be made and according to the production requirements of each window and door framework manufacturer.

Furthermore the process results in the counter-mould elements manufactured this way permitting to obtain window and door frameworks with lateral faces having profiles as regular and conforming as possible, as well as devoid of welding beads, whereby the window and door framework opening and closing operations performed by users are particularly easy.

The invention claimed is:

1. A process for a realization of a counter-mould elements of a machine for welding plastic profiled elements for windows/doors frames, comprising:
    at least one phase of acquisition of a profile of at least one portion of lateral faces of a pair of plastic profiled elements to be welded together, each profiled element comprising at least one welding surface weldable to a welding surface of another profiled element, where said lateral faces of said profiled elements welded together are substantially adjacent to each other;
    at least one phase of definition of a profile of at least one contact surface (3) of a counter-mold element (1), adapted to receive in abutment spa locator surface defined by said lateral faces substantially adjacent to each other of said profiled elements welded together, said profile of said contact surface (3) being substantially complementary to a profile of said locator surface;
    at least one phase of three-dimensional molding wherein at least one three-dimensional molding device (4) is used to obtain a main body (2) of said counter-mold element (1), provided with said contact surface (3), starting from said profile of said contact surface (3) obtained in said phase of definition.

2. The process according to claim 1, wherein said three-dimensional molding device (4) comprises deposition means of at least one liquid photopolymer material and solidification means of said liquid photopolymer material.

3. The process according to claim 2, wherein said solidification means comprise at least one polymerization unit.

4. The process according to claim 3, wherein said phase of three-dimensional molding comprises:
    at least one phase of deposition of at least one of:
        a first liquid photopolymer material for the realization of at least one primary layer of said main body (2); and
        a second liquid photopolymer material for the realization of at least one secondary layer adhering to at least one portion (6) of a lateral surface of said main body (2), to the exclusion of said contact surface (3), and removable from said lateral surface of the main body (2);
    said phase of deposition being formed on at least one substantially horizontal deposition plane (5) by means of said deposition means;
    at least one phase of solidification of at least one of said first photopolymer material and said second photopolymer material by means of said polymerization unit to obtain at least one of said layers, said phase of solidification being subsequent to said phase of deposition;
    at least one phase of substantially vertical growth of said layers starting from said deposition plane (5), said contact surface (3) being directed upwards with respect to said deposition plane (5).

5. The process according to claim 4, wherein said process comprises at least one phase of removal of said secondary layer from said main body (2).

6. The process according to claim 1, wherein said contact surface (3) is substantially free of roughness.

7. The process according to claim 1, wherein said phase of acquisition comprises a phase of detecting a perimeter of a cross section of said profiled elements.

8. The process according to claim 1, wherein said phase of definition comprises a phase of adjustment of movement of said three-dimensional molding device (4) to obtain said main body (2) having said contact surface (3).

9. A machine for the welding of plastic profiled elements, wherein said machine comprises at least one counter-mould element (1) obtained through the process according to claim 1.

* * * * *